(12) United States Patent
Marsh et al.

(10) Patent No.: US 8,209,203 B1
(45) Date of Patent: Jun. 26, 2012

(54) SYSTEM, METHOD, AND COMPUTER PROGRAM FOR TRACKING FLOATING PRODUCTION SYSTEM MARKET AND TECHNICAL DATA

(75) Inventors: Thomas Marsh, Houston, TX (US); Arnljot Arnsten, Oslo (NO); Cedric Raguenaud, Aberdeen (GB); Jesus Rios, Richmond, TX (US); Arne Skjelvan, Oslo (NO); Paal Hansen-Tangen, Billingstad (NO); Steven Carter, Katy, TX (US); Stuart Cochrane, Aberdeenshire (GB); Ryan Isherwood, Houston, TX (US); Jeremy Lindsay, Suffolk (GB); Mark Bouzek, Kingwood, TX (US)

(73) Assignee: ODS-Petrodata, Ltd., Norfolk (GB)

( * ) Notice: Subject to any disclaimer, the term of this patent is extended or adjusted under 35 U.S.C. 154(b) by 889 days.

(21) Appl. No.: 12/243,542

(22) Filed: Oct. 1, 2008

Related U.S. Application Data

(63) Continuation-in-part of application No. 10/208,548, filed on Jul. 30, 2002, now Pat. No. 7,512,544, and a continuation-in-part of application No. 11/393,264, filed on Mar. 30, 2006, now abandoned.

(60) Provisional application No. 60/308,745, filed on Jul. 30, 2001, provisional application No. 60/317,214, filed on Sep. 5, 2001.

(51) Int. Cl.
*G06F 17/60* (2006.01)
(52) U.S. Cl. ...................................... 705/7.11
(58) Field of Classification Search ............... 705/7.11
See application file for complete search history.

(56) References Cited

U.S. PATENT DOCUMENTS

| | | | |
|---|---|---|---|
| 5,447,114 A * | 9/1995 | Korsgaard | 114/230.13 |
| 5,649,186 A * | 7/1997 | Ferguson | 1/1 |
| 6,594,654 B1 * | 7/2003 | Salam et al. | 1/1 |
| 6,652,192 B1 * | 11/2003 | Xu et al. | 405/195.1 |
| 6,778,982 B1 * | 8/2004 | Knight et al. | 707/737 |
| 6,907,375 B2 * | 6/2005 | Guggari et al. | 702/113 |
| 7,270,071 B1 * | 9/2007 | Shivers et al. | 114/265 |
| 2003/0074391 A1 * | 4/2003 | Carter et al. | 709/200 |
| 2006/0059137 A1 * | 3/2006 | Walker | 707/3 |

OTHER PUBLICATIONS

Garrett (Coupled analysis of floating production systems), Dec. 2005, Ocean Engineering 32, pp. 802-816.*

* cited by examiner

*Primary Examiner* — Romain Jeanty
(74) *Attorney, Agent, or Firm* — Blakely Sokoloff Taylor & Zafman LLP

(57) ABSTRACT

An integrated data management system, method, and computer program for querying, collecting, tracking, comparing, and displaying floating production system daily operations data, market data, and technical data to one or more users is disclosed. The data management system includes one or more processors with memory carrying one or more sequences of computer instructions for receiving floating production system data from floating production systems (FPS), receiving search criteria from the users, and comparing the floating production system data to the search criteria to determine matches between the FPS data and the search criteria. The floating production system data includes fleet and vessel data, upcoming tenders, latest project sanctions, technical specifications, status criteria, and market news. A user accesses the system with a graphical user interface and uses market information modules, news search modules, and other modules for searching and comparing floating production system data for generating user reports.

32 Claims, 11 Drawing Sheets

SYSTEM, METHOD, AND COMPUTER PROGRAM FOR TRACKING FLOATING PRODUCTION SYSTEM MARKET AND TECHNICAL DATA

CROSS REFERENCE TO RELATED APPLICATIONS

This application is a Continuation-in-Part Application of U.S. patent application Ser. No. 10/208,548 now U.S. Pat. No. 7,512,544, filed on Jul. 30, 2002, which claims the benefit of U.S. Provisional Patent Application Ser. No. 60/308,745, filed Jul. 30, 2001 and U.S. Provisional Patent Application Ser. No. 60/317,214 filed Sep. 5, 2001, and a Continuation-in-Part Application of U.S. application Ser. No. 11/393,264 which was filed Mar. 30, 2006 now abandoned, the disclosures of which are incorporated herein by reference.

FIELD

The embodiments relate to integrated data management systems and methods for querying, collecting, storing, and tracking floating production system market and technical data and related news and generating a user report of selected floating production system market and technical data.

BACKGROUND

Considerable amounts of time and coordinated efforts are required in the exchange of commercial and individual information for comparing and fulfilling market demand criteria with supply criteria for floating production systems.

Given the quantity and varying types of floating production systems, and the variety of geographical regions for operation, the beginning task of contacting the individual owners and operators for notification of market demands as well as for meeting the market demands is a monumental task. Contacting individual owners and operators can require great amounts of time and labor to retrieve information on: types of available floating production systems, planned or new tender offers for floating production systems, floating production systems going to dry dock for repairs, new construction of floating production systems, dates and extensions of floating production system contracts, and individually related market news stories.

Currently, there is no existing consolidated and integrated data source, nor comprehensive website, for providing, receiving, and interacting with users in regards to floating production system data, such as: production rates for floating production systems, storage capacity, dates of current tender offers and length, project availability and status, contract status and dates, owner and operator data, field information, and deployment and work status with geographical region information. In addition, many of the present World Wide Web business and company sites are predominantly provider-driven sites for providing company information and advertisements to consumers, such that there is currently no existing websites for providing an integrated data management system and method for real-time interaction in providing and receiving floating production systems data and related market news.

Thus, a need exists for a system and method to provide to an individual user with an integrated and consolidated data management system and method for accessing and responding to current and up-to-date information on floating production systems that is easy to understand, quick to access, and easy to use.

The embodiments meet these needs.

BRIEF DESCRIPTION OF THE DRAWINGS

The detailed description will be better understood in conjunction with the accompanying drawings as follows.

Figure 1:
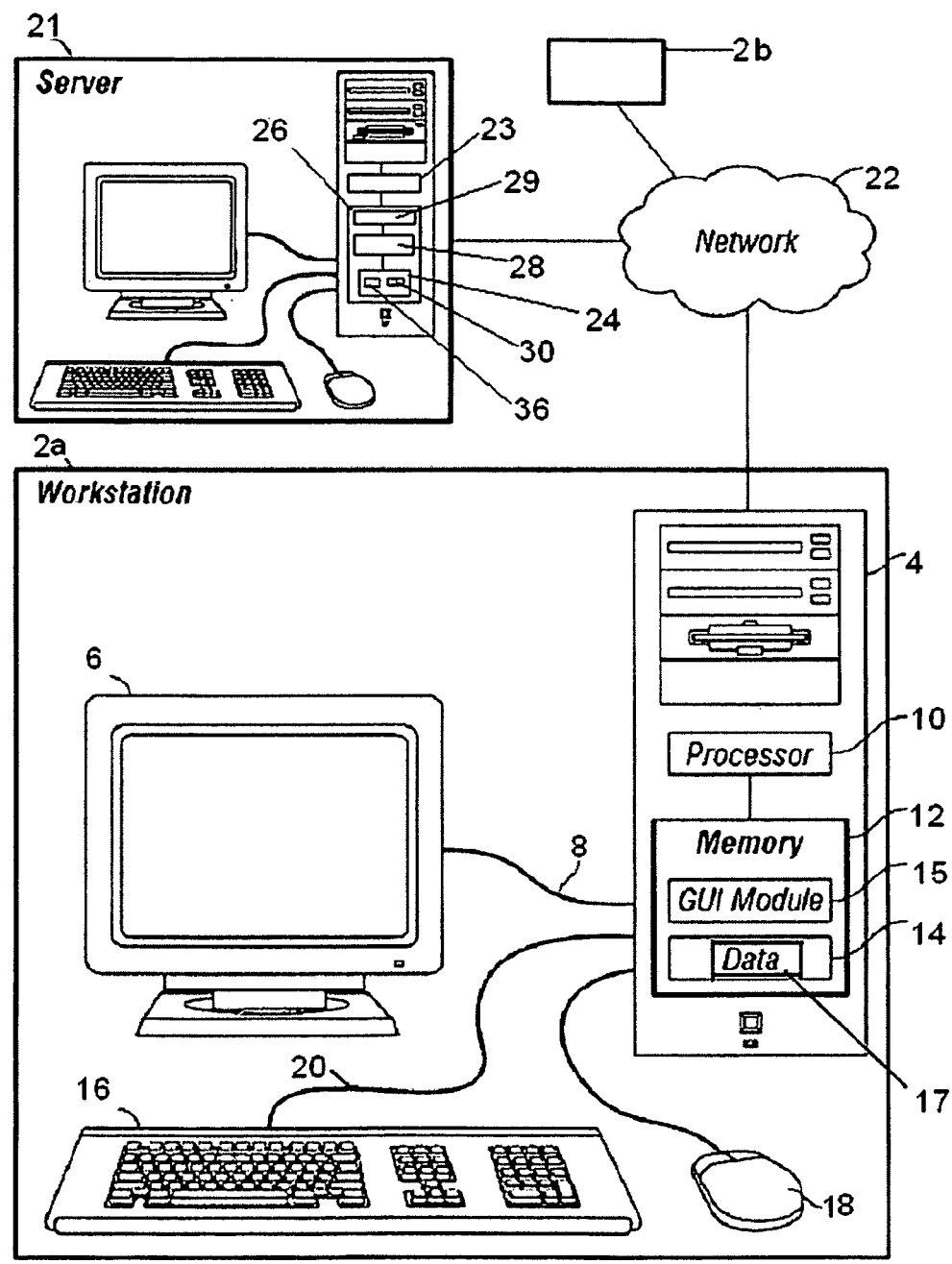
FIG. 1 depicts a network-based server system for hosting the floating production system data and its interface to a user.

The embodiments are detailed below with reference to the listed Figures.

DETAILED DESCRIPTION OF THE EMBODIMENTS

Before explaining the embodiments in detail, it is to be understood that the embodiments is not limited to the particular embodiments and that the embodiments can be practiced or carried out in various ways.

The embodiments relate to integrated data management systems and methods for querying, collecting, storing, and tracking floating production system market and technical data and related news and generating a user report of selected floating production system market and technical data.

The embodiments generally relate to systems, methods, and computer programs for providing and receiving continually, or at least daily, updatable searchable information to and from a user via a network-based server system, such as the Internet, or other graphical user interface (GUI) system for exchanging the information regarding floating production systems (FPS), equipment used with floating production systems, and related market news.

The embodiments of the system, method, and computer program include users who are operators/non-operators of floating production systems, owners of floating production systems, contractors, market participants, lessors/lessees, equipment owners, invitees, and other users in oil and natural gas exploration and production with access to the network-based server and data management system.

The embodiments are contemplated to save time in collecting global market and technical data on floating production systems, and to provide complete and more efficient access to market and technical data on floating production systems to users with a need for such data, such as users that explore for and produce offshore resources; users that construct and/or provide equipment for offshore resource exploration and production; users that repair the equipment used in offshore resource exploration and production; and users that require data for technical and financial analysis of offshore resource exploration and production activities.

The embodiments help conserve and promote more efficient production and use of fossil fuels by providing a more comprehensive set of information that will enable producers of offshore oil and gas to acquire or develop more efficient technical schemes for offshore oil and natural gas production.

An embodiment contemplates operation on a server system that can be a distributed server system with a graphical user interface, and an administration input interface that enables the system to provide constantly updated data and/or daily updated data to the user.

The data management system is an integrated computer system for querying, collecting, tracking, comparing, and displaying floating production system daily operations, market, and technical data; data on equipment to be used with or on floating production systems; and related market news. The data management system provides floating production system data to one or more users. The data management system includes one or more processors with memory carrying one or more sequences of computer instructions, which when executed by the one or more processors, causes the one or more processors to perform the steps of: receiving floating production system data from floating production systems, receiving one or more search criteria from the one or more users, and comparing the floating production system data to the one or more search criteria to determine if the floating production system data matches the one or more search criteria.

The embodiments of the system and method include floating production system data that can be searched and compared, which includes: fleet data, upcoming tenders, latest project sanctions, vessels coming off contracts, and market news. The system and method include computer instructions for updating the fleet data on a continual basis, or at least daily basis, by using parameters that include: vessel names, fleet names with vessels, charts of fleets by region, charts of fleets by type of vessel, and combinations thereof.

Other floating production system data that can be searched and compared includes: technical specifications, status criteria, geographical regions for deployment and work, owner and operator data, country data, and related market news.

Embodiments of the data management system and method enable the user to have selected access to the database of the data management system, in which the user access and usage of the database is protected by a unique user password and user profile information.

The embodiments of the system and method enable the user to collect floating production system data by using the data management system, which includes network-based server systems, a computer with a processor, a memory, a database, and a graphical user interface, and computer modules for searching and compiling the data, such as a market information module, a floating production system supply module, a floating production system demand module, a floating production system technical specification module, a saved query module, a news module, a news search module, and a saved news search module that generates a unique user-specific email newswire notification of relevant floating production market news postings on a user-specified timetable.

The data management system enables the user to log in using the user's unique password and to use the computer modules for collecting, tracking, searching and comparing the floating production system data and search criteria for floating production system demand and supply. Further, the data management system allows the user to generate data on future projected floating production system supply and demand over a user-specified time frame.

The embodiments of the data management system and method enable the floating production system data and related market news stories to be selected and configured into configurable data records for visual display in generating a user report. The data records can be obtained directly from search criteria, which can be saved to the database of the data management system for configuring the data records. The configurable data records can be formatted using computer instructions on the data management system for formatting the configurable data records into such visual images as: bar charts, pie charts, tables, graphs, and other visual images. Then, the embodiments of the system and method enable the sending of the generated user report to one or more users by using communication links.

With reference to the Figures, FIG. 1 depicts an illustration of a data management system to perform an embodiment of the invention. In FIG. 1, a network based server system, such as an Internet-based server system, is used for hosting the collecting, tracking, and display of the floating production system data and search criteria and its interface to one or more users.

In the embodiments, the system includes a user device as a workstation (2a) with a computer (4), which can be coupled to a video display (6) via an external graphics bus (8). The external graphics bus (8) can be an Advanced Graphics Port (AGP) compliant bus. The term "coupled" encompasses a direct connection, an indirect connection, such as a wireless connection or the like. The computer (4) in one embodiment includes a processor (10), which can be, for example, a Pentium™ III processor manufactured by Intel Corp. of Santa Clara, Calif. In another embodiment, the processor (10) can be an Application Specific Integrated Circuit (ASIC). The computer (4) can include a memory (12) coupled to the processor (10). The memory (12) can encompass devices adapted to store digital information, such as Dynamic Random Access Memory (DRAM), Rambus™ DRAM (RDRAM), flash memory, a hard disk, an optical digital storage device, a combination thereof. It is contemplated that the memory (12) can also connect to remote database storage (14) for storing data (17) via a graphical user interface (GUI) (15). The computer (4) can be coupled to a keyboard (16) alone, or with a mouse (18) via an external computer bus (20). In one embodiment, the external computer bus (20) can be a Universal Serial Bus (USB) compliant bus.

The workstation (2a) connects to a server (21) via a network (22), such as the Internet, a subscriber network, a cable communications network, a wireless communications network, a satellite network, or other network for providing a server system for managing the floating production system data. The server can include a server processor (23), a server database storage (24) in communication with a server memory (26) for hosting the computer instructions (28), and a graphical user interface (GUI) module (29) to provide requested data (30) to the user device (2a) and a second user device (2b), by which the user can access the system using the gui interfaces. Examples of user devices usable herein include: Blackberrys™, a cellular phone with display and processing capabilities, another computer such as a laptop or a desk system, an interactive television devise, and similar interactive devises with display and connectivity to a network. The server (21) can accept updated data (36) from the computer (4) of the workstation (2a) of a user.

The user can access the server via a website on the Internet. The server can host the computer instructions that can offer choices to a user to obtain data on floating production systems.

These computer instructions can be executable by the server processor to perform a method in accordance with an embodiment of the present invention. The term "instructions adapted to be executed" is meant to encompass any instructions that are ready to be executed in their present form (for example, machine code) by a processor, or that require further manipulation, for example compilation, decryption, decoding, or provided with an access code, etc., to be ready to be executed by a processor.

Examples of network (22) include the Internet, a WAN (wide area network), a LAN (local area network), an Intranet, a subscriber network, a communications network, a computer network, a satellite network, and combinations thereof. In one embodiment, the server can be in communication with a storage device that typically stores data on a magnetic medium, such as a magnetic disk. For example, the storage device may store application programs and associated data files/documents. Examples of documents include word processing documents, spreadsheet documents, HTML (Hypertext Markup Language) documents, and the like.

The workstation can access data stored in the storage device via the server system and network for continuous updating of the data accessible to the user. The server displays information on a webpage.

Data hosts on the server can encompass hierarchical data, non-hierarchical data, and the like. Data can be a document corresponding to a particular application, such as a word processing document, a spreadsheet document, an HTML document, and the like. The data can include: offshore vessel data, technical specifications for floating production systems, owner and operator data, contract data, supply of floating production systems by region or country, market news data, stored query data, and other relevant information which will become more evident in the remaining figures.

Computer instructions, adapted to be executed by a processor to perform the embodiments, are stored on a computer-readable medium and distributed as software. The computer-readable medium can be a device that stores digital information. For example, a computer-readable medium includes a portable magnetic disk, such as a floppy disk; or a Zip™ disk, manufactured by the Iomega Corporation of Roy, Utah, wherein Zip™ is a registered trademark of Iomega Corporation, or a Compact Disk Read Only Memory (CD-ROM) as is known in the art for distributing software. The computer-readable medium can be distributed to a user that has a processor suitable for executing instructions adapted to be executed.

Figure 2:
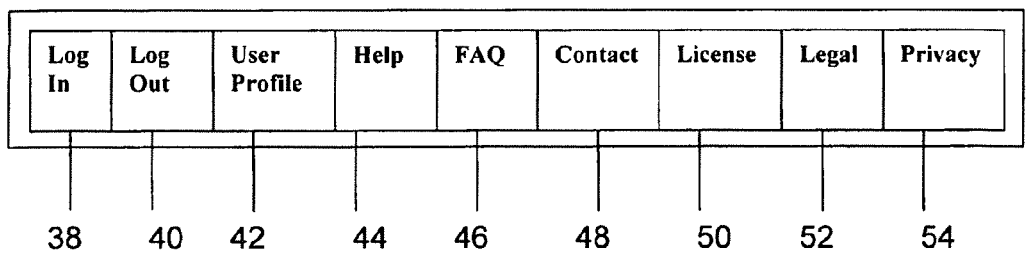
FIG. 2 depicts an embodiment of a tool bar usable in a system, method, and computer program for tracking and displaying floating production system data.

FIG. 2 depicts an illustration of a tool bar usable on a web page to be displayed by the server for the data management system. The tool bar would be located on a home page of the website embodying the invention. The home page provides a unique snapshot of the current activities regarding floating production systems (FPS) and current FPS market news generated by the proprietary data within the system.

In the embodiment shown in FIG. 2, the tool bar contains icons for: "Log In" (38), "Log Out" (40), and "User Profile" (42). The "Log In" (38) feature enables the user to create and use a password that is unique to the user in order to protect the user regarding site access and information privacy.

After the user enters his/her unique password, which is linked to the user's name and other personal or company information, and receives access to the home page website, then the user can use the system to answer general questions about floating production systems, contact information about the company, and other information relevant to the system and the company. The "Log Out" (40) feature enables the user to end his/her logged in session with the website.

The "User Profile" (42) featured icon contains the login identification information, which includes such personal or company information as: user's First Name, user's Last Name, user's Company Name, user's Address, user's Zip Code, user's Phone Number, user's Email Address, user's Country, and an indication of the desired Newswire Format that the user desires to receive, which can be a Text newswire, an HTML newswire, or an HTML attachment. The "User Profile" (42) permits modification of the "User Profile" by the user, such as updating user contact information and other personalized updates for meeting the user's needs or changes in the user's work responsibilities.

Continuing with FIG. 2, the tool bar includes a "Help File" (44) which contains information, such as text information on how to use the data management system and how to access the system. The tool bar also has an icon representing "FAQ" (46) or "Frequency Asked Questions" by users regarding the data management system. Another icon is the featured button labeled "Contact" (48), which is designed for providing administrator contact information, such as the company's name and addresses for the United States and Europe, the company's phone numbers for United States and Europe, and the company's email addresses.

Additionally the tool bar contains an icon for "License" (50), which is a form license agreement that subscribers must read and agree to prior to activation of their access to the data management system. The tool bar can include a featured icon for "Legal" (52), which includes legal notices and disclaimers. Finally, the toolbar can include an icon for "Privacy" (54), which would indicate the websites privacy policy and information protection for the company and its users.

Figure 3:
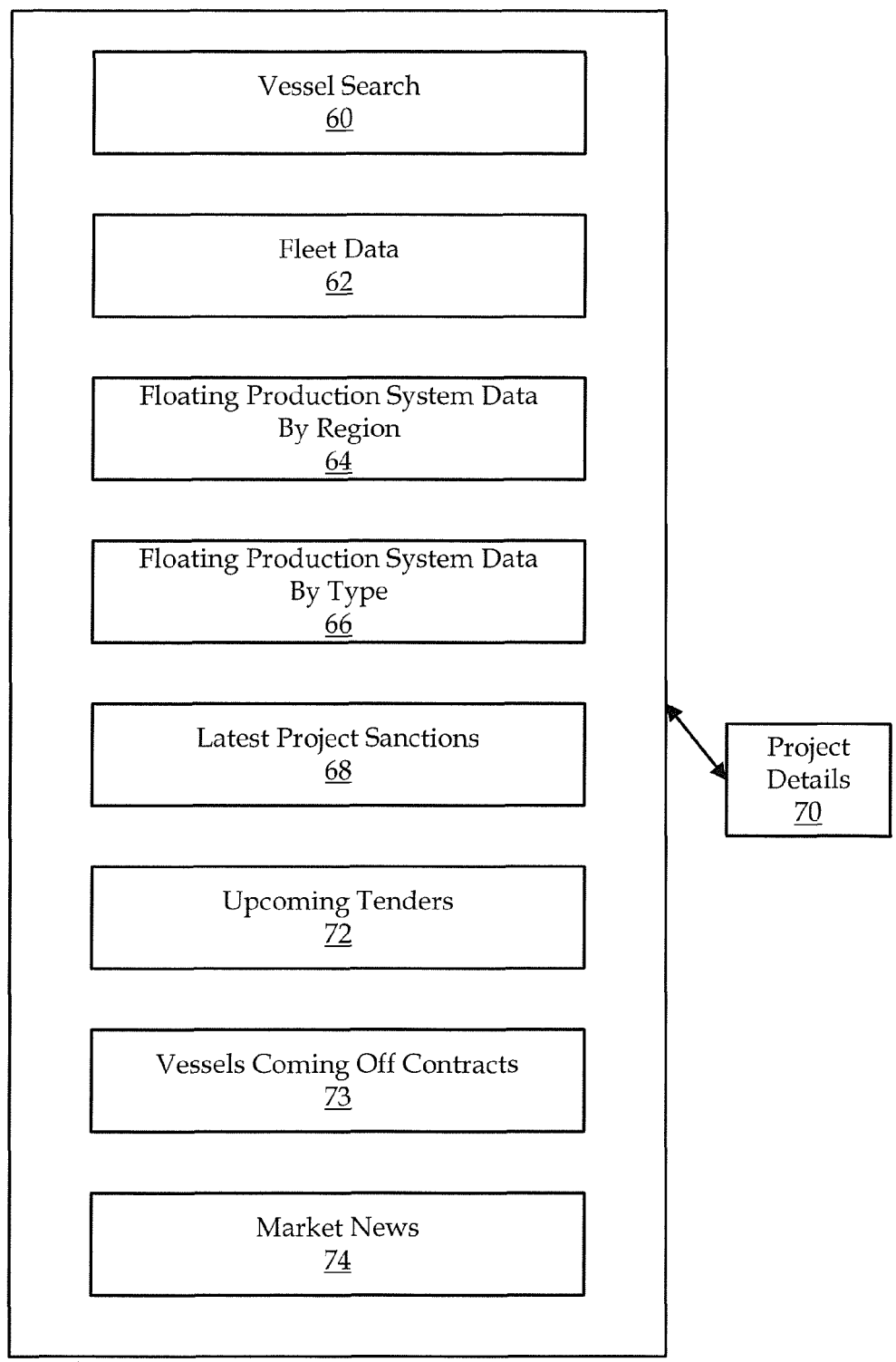
FIG. 3 depicts an embodiment of a first group of data usable in a system, method, and computer program for tracking and displaying floating production system data.

FIG. 3 depicts a first screen that a logged-in user would view to implement the system and method of the invention.

The embodiments of the invention generally relate to a data management system, methods, and computer programs for tracking floating production system technical and market data and related market news. The data management system and methods provide floating production system data and search criteria to one or more users. The data management system includes one or more processors with memory carrying one or more sequences of computer instructions, which when executed by the one or more processors, causes the one or more processors to perform the steps of: receiving floating production system data from floating production systems, receiving one or more search criteria from the one or more users, and comparing the floating production system data to the one or more search criteria to determine if the floating production system data matches the one or more search criteria. The embodiments of the system and method include floating production system data, in which computer instructions can be used for searching the data, including: fleet data, upcoming tenders, latest project sanctions, vessels coming off contracts, and market news.

As depicted in FIG. 3 and in this step of the method, the user can search for and view vessel-specific data (60), by viewing and selecting from a listing of vessel names, for example, the floating production storage and offloading vessel Dalia (FPSO-based Dalia) or the Agip Milano vessel owned and operated by Agip.

The user can view Fleet Data (62), that is generated on demand from the proprietary data within the database and illustrates graphically the number of floating production systems that are either under construction or working or projected to be under construction or working over the system-specified timeframe. The system automatically generates the Fleet Data (62) on both a Region (64) and Type (66) basis. This information is automatically reviewed, supplemented, and updated, at least daily, by the company administrator, which can include teams of reporters and editors for the company. As a result, the user only views the most up-to-date data available regarding floating production systems, equipment, and related market news.

The user can view fleet data by Region (64) or by Type of floating production system (66). Charts of "Fleets by Region" includes fleets in the regions of: United States of America (USA)-Gulf of Mexico, USA-Pacific, West Asia, Canada, and Australia/New Zealand and other areas as recorded in the database. The user can view charts of fleets by Type of floating production system (66), which includes such types as a tension leg platform, semi-submersible, standard ship shape, and others. These charts of fleets by Region or by Type of floating production system can be color-coded and can be forecasted for the subsequent 10 years based on available data compiled from the owners and operators of the floating production systems.

Additionally, the user can view Latest Project Sanctions (68) which include, for example, project Puffin of Australia, in which the contract was sanctioned to begin on March, 2006, with deployment to start on December, 2006. In the latest project sanctions (68), it is contemplated that, based on the user selected data, the data can contain embedded links to other web pages generated by the system for more Project Details (70), such as field data, owner and operator data, and dates for contracted and planned projects.

FIG. 3 shows that the user can view Upcoming Tenders data (72), such as the project Olowi of Gabon with a tender start date of April, 2006, and a tender end date of December, 2006. Additionally, the users can view information on Vessels Coming off Contracts (73), such as FPSO BW Songa working on the Maui field offshore New Zealand and coming off contract in April, 2006.

The users can view Market News (74) pertaining to floating production systems, and can receive optional analyst comments on the market news provided by the administrator of the system. For example, the market news on Mar. 13, 2006, included the news story, "Norway is looking to develop the Goliat Field via an FPSO-based solution" and the market news site provided a link, in which the user can select for reading more about this particular news story. The market news is updated daily by company teams of editors and reporters to provide the most recent and current coverage of the commercial aspects of floating production system activity. The market news is focused by geographical region or market sector and includes data information regarding market demand criteria and FPS and equipment supply criteria for the floating production systems.

Figure 4:
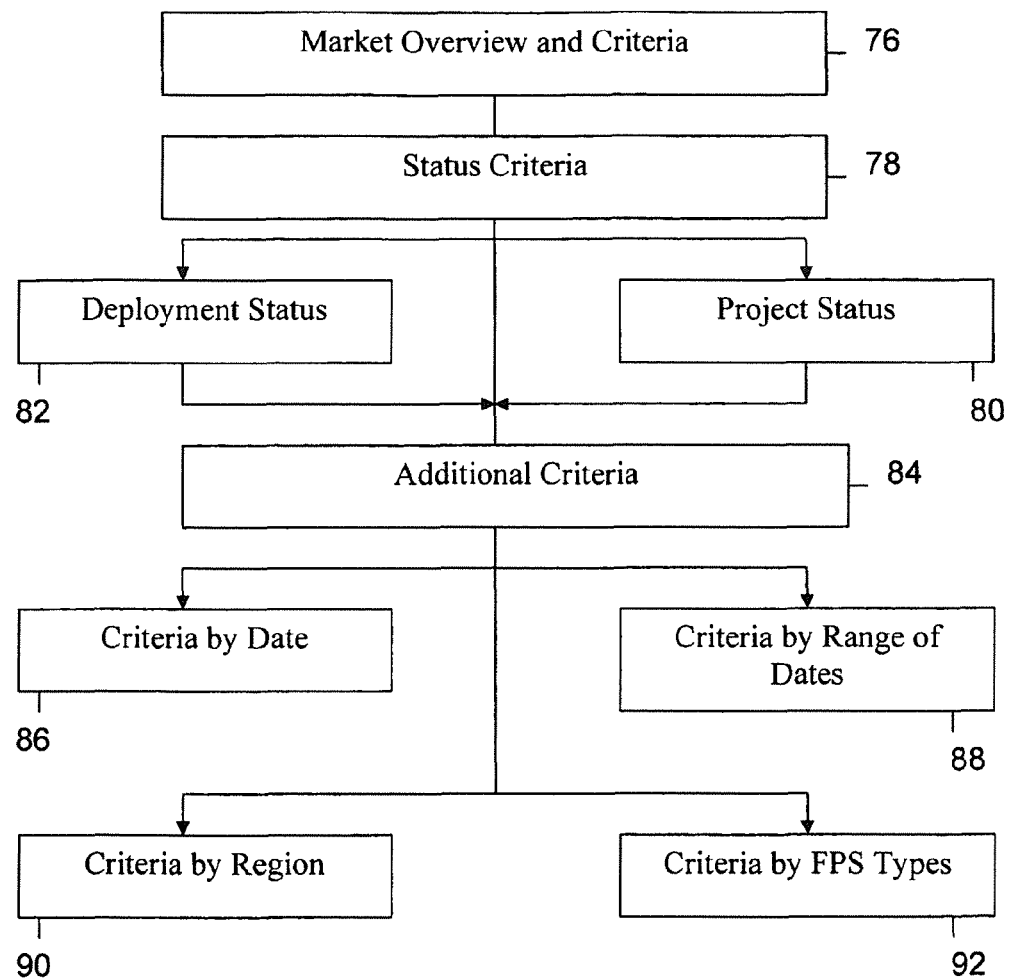
FIG. 4 depicts an embodiment of a second group of data usable in a system, method, and computer program for tracking and displaying floating production system data.

FIG. 4 depicts a second screen that a user can view to implement the system and method of the invention. In this step of the method, the user advances from the home page to a market insight menu page which enables the user to view the Market Overview and Criteria (76) information regarding floating production systems.

The Market Overview (76) screen contains searchable content for acquisition and viewing by the user, such as Status Criteria (78) for floating production systems. The Status Criteria (78) includes Project Status (80), Deployment Status (82), and combinations thereof.

In selecting the project status (80), the user can query the data management system using, for example, a market information module of the system, for receiving data on the status of current projects for floating production systems. This enables the user to view the status of a particular floating production system or a fleet of vessels, such as if the project is contracted or the project is planned for contracting.

If the user selects to view the Status Criteria (78) by Deployment Status (82), then the viewer has such options as querying the data management system and viewing floating productions systems that are, for example: deployed en route to a destination, idle or retired, under construction, or currently working. Further, the user can select all of these Deployment Status options for querying and viewing the status of the floating productions systems, or the user can select a particular deployment option for querying, collecting, and displaying the status data for the floating production systems. For example, the user can query the data management system for FPSOs that deployed in March, 2006, and are en route to Jabung field. Results of the query are collected and displayed to the user, in which the results include that the Jabung project, operated by PetroChina of Indonesia, was leased in February, 2006, and deployed in March, 2006, on the Jabung field.

The embodiments of the system and method include computer instructions that enable the user to query the data regarding the Market Overview (76) and Status Criteria (78) of a floating production system by using Additional Criteria (84) for further filtering and sorting of the data, such as by Date (86), a Range of Dates (88), a Geographical Region (90), and Type of Floating Production System (92).

The Status Criteria (78) and Additional Criteria (84) are updated, at least daily, to provide the most recent and current commercial aspects and product information for floating production systems. Accordingly, querying, collecting, and displaying floating production system data can be performed using such additional criteria as a particular date, such as a deployment date of March, 2006. The result of such a query can display data information on the Jabung FPSO project that deployed in March, 2006, for example. A range of dates can be used, such as deployment from December, 2005, to March, 2006, which can display results to a user of projects Puffin and Jabung, which deployed in December, 2005 and March, 2006, respectively, for example.

Other Additional Criteria (84) that can be used include Geographical Regions (90) for deployment or work planned or currently being performed and Types of floating production systems (92). For example, the user can query and display floating production system data by the geographical region in which the floating production system is currently working, which allows the user to use Deployment Status (82) and Geographical Region (90) as criteria for the query and display.

A floating production system can consists of a semi-submersible floater, a riser, a catenary mooring system, a subsea system, export pipelines, and production facilities. Criteria based on Types of Floating Productions Systems (92) can be used for tracking data, and the types can vary according to equipment and use or the work to be performed by the floating production system. The database storage of the data management system maintains information on the various types of floating production systems; including types of floating production systems with particular capabilities, types of moorings, water depth that the floating production systems can be placed in, and sizes and costs of the floating production systems. For example, the type can vary by water depth capabilities, such as the deepwater floating production system working in the Usan field which operates at depths up to 2500 feet, or the semi-submersible floater system that will begin work in the Olowi field and operates at depths of 60 feet.

Figure 5:
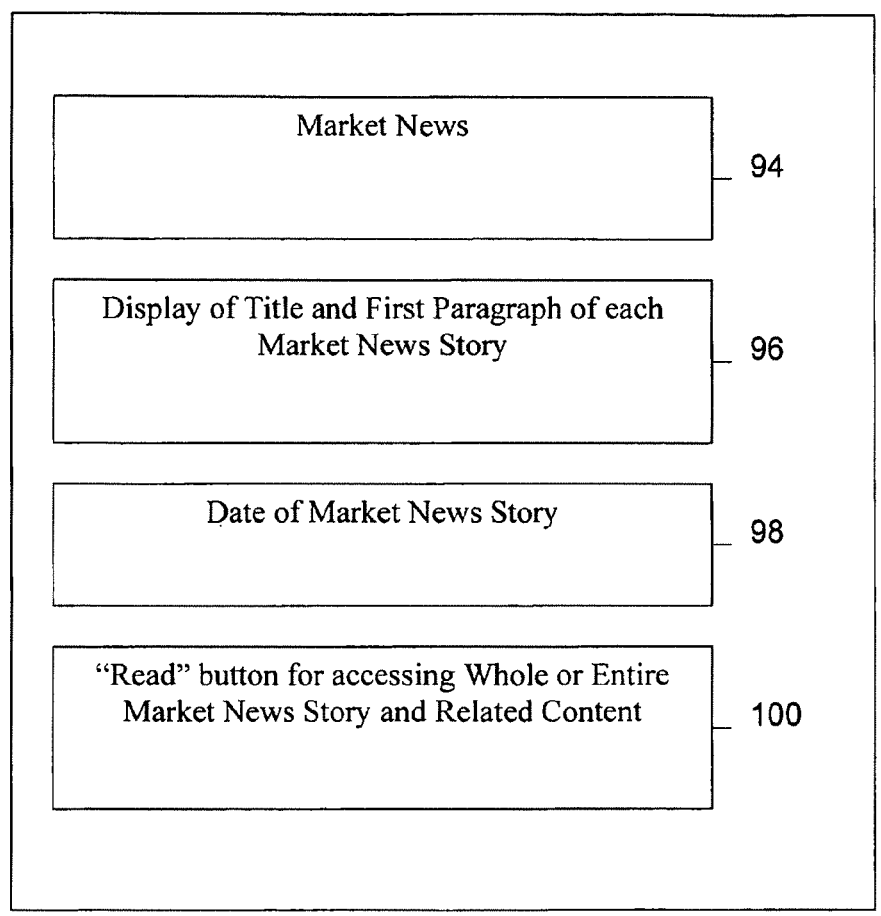
FIG. 5 depicts an embodiment of a third group of data usable in a system, method, and computer program for tracking and displaying floating production system data.

FIG. 5 depicts a third screen that a logged-in user would view to implement the system and method of the invention. In this step of the method, the user advances through the market insight menu page to view Market News (94) information regarding floating production systems. The Market News screen enables the user to view the market news that has been posted by ODS-Petrodata editors and reporters in a reverse chronological order, with an option to use computer instructions for selecting and displaying more content on the market news story.

The Market News (94) screen displays the Title and First Sentence or Paragraph (96) of the latest news on floating production systems. The release date for each news story edition (98) is displayed on the Market News (94) screen, in reverse chronological order. Accordingly, the data management system includes computer instructions that enable the user to query the system for locating a particular news story by using the date of the market news story (98). For example, a query for news stories on Mar. 13, 2006, would render the results of a market news story regarding the "FPSO for Goliat", in which the user can review such data information as "ENI of Norway is looking to develop the Goliat field via an FPSO-based solution." A "Read" button is included for each market news story to enable the user to access the whole or entire market news story and related content (100).

Figure 6:
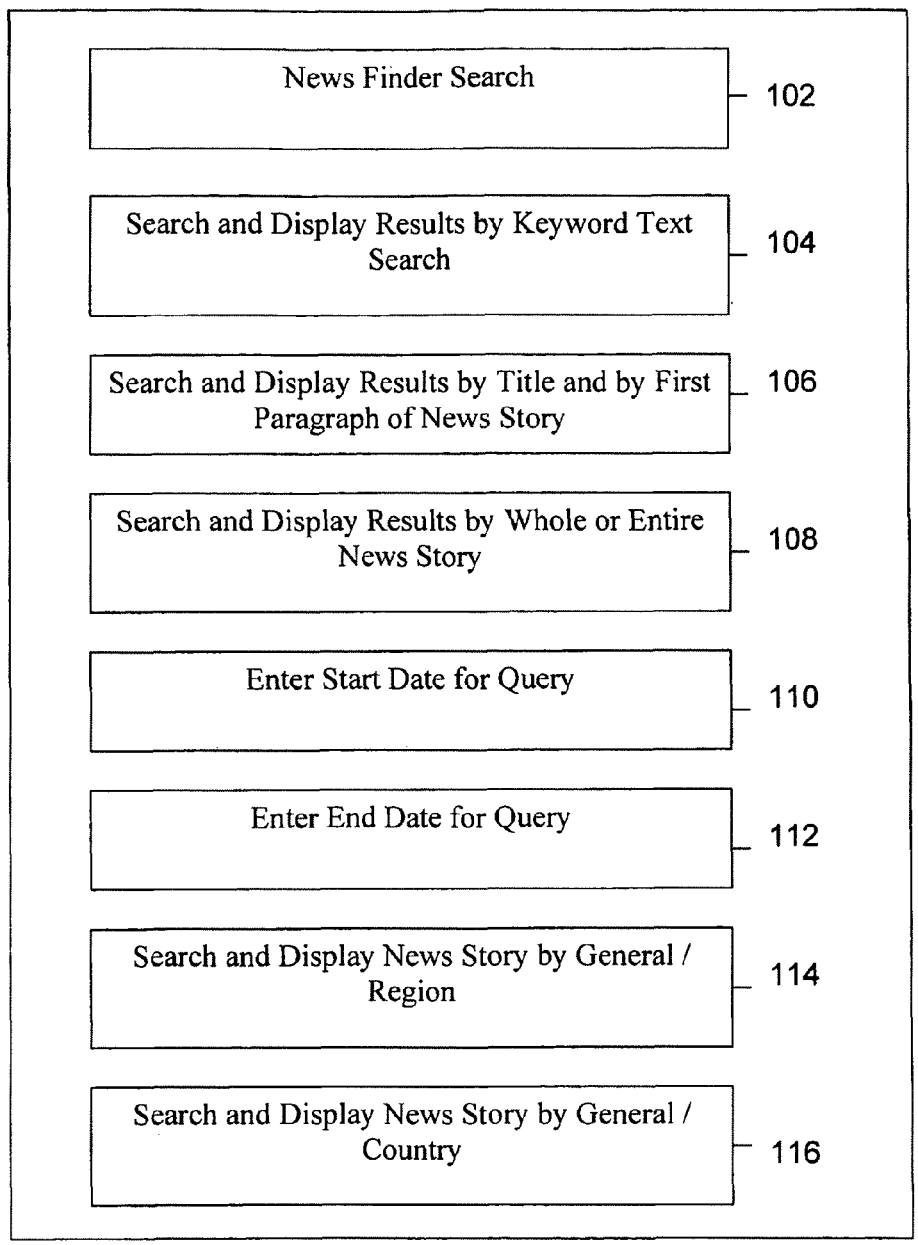
FIG. 6 depicts an embodiment of a fourth group of data usable in a system, method, and computer program for tracking and displaying floating production system data.

FIG. 6 depicts a fourth screen that a logged-in user would view to implement the system and method of the invention. In this step of the method, the user advances through the market insight menu pages to view a News Finder Search (102) screen for searching information regarding the floating production systems. The embodiments of the system and method enable the user to use a news search module with computer instructions to search for, or query, and view the current and historical news stories regarding floating production systems.

The embodiments of the data management system and method enable the logged-in user to use featured buttons for narrowing the text search for a particular market news story regarding floating production systems and for greater refinement of searches or queries using parameters in addition to keywords located in the text of the news story. These parameters for querying market news stories include: a query start date, a query end date, a region, a country, and combinations thereof.

The user can begin a search for a news story by entering a keyword in the "Search For" box (104) located on the News Finder Search (102) screen. Next, the user can request a display of the news story by the Title and First Paragraph of the news story (106).

The embodiments of the system and method include a market news story finder query function with display user preferences that allow the user to request the display of news stories by "Whole Stories" (108), in addition to "Title" and "First Paragraph". Further, the embodiments enable the user to enter an optional Start Date (110) for the query, which includes the earliest date possible for the publication of the news story edition, and an optional End Date (112) that is the latest date possible for publication of the news story edition, for which the user is searching.

Other parameters that can be used for searching, which are included in the news story finder query function, are the featured buttons that allow the user to use data filters for sorting and displaying the news stories by General Region (114) or General Country (116). General Region (114) parameters can include the region to which the floating production system was deployed for working in a particular field, such as Southeast Asia, West Asia, or USA-Gulf of Mexico. General Country (116) parameters (116) can include the country in which the floating production system is operating.

Figure 7A:
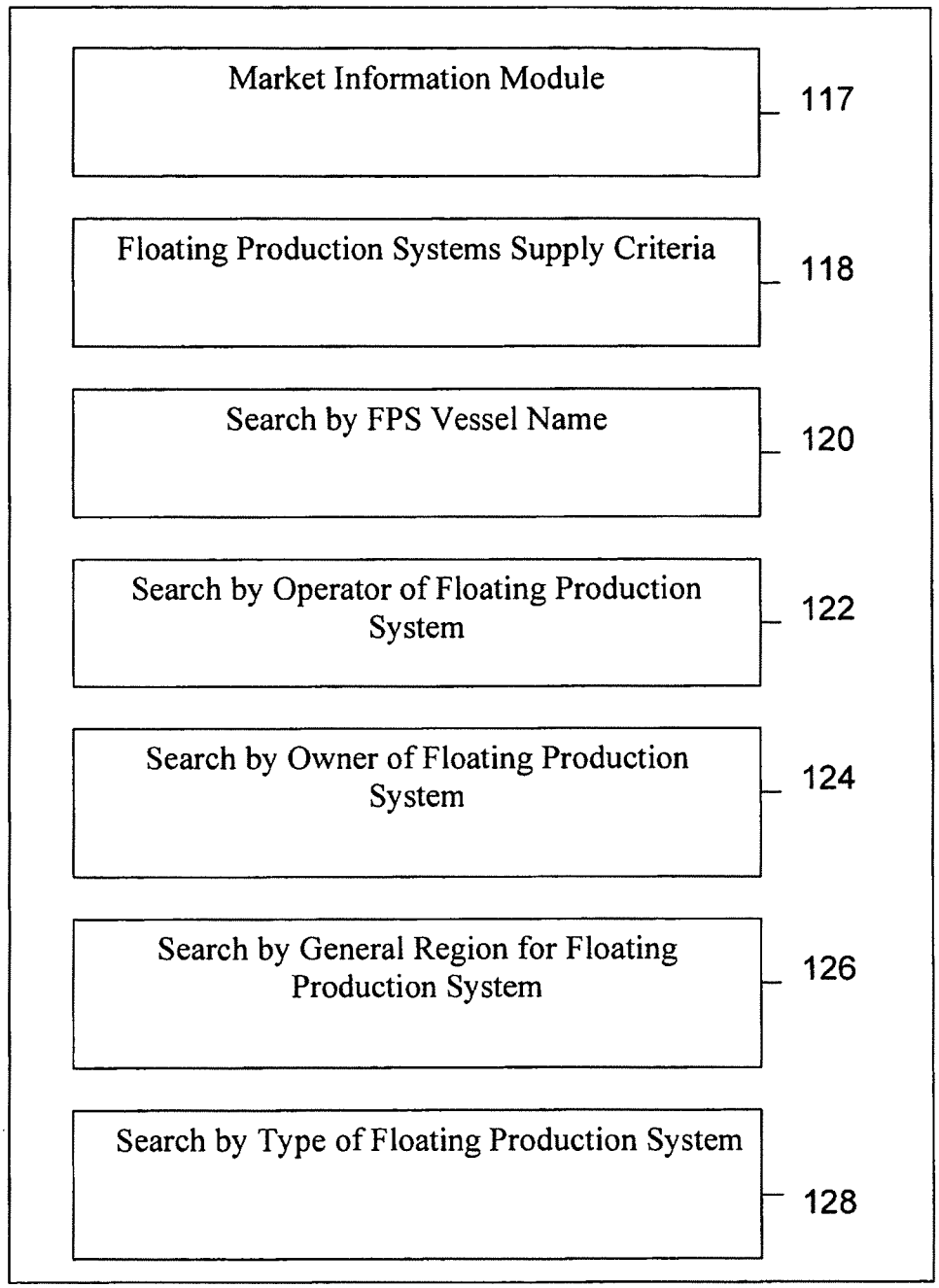
FIG. 7a depicts an embodiment of a fifth group of data usable in a system, method, and computer program for tracking and displaying floating production system data.

FIG. 7*a* depicts a fifth screen that a logged-in user would view to implement the system and method of the invention. In this step of the method, the user advances to the market menu pages for viewing the screen regarding Floating Production System (FPS) Supply Criteria (118). Other screens in the market menu include Floating Production System Demand Criteria (130) and Technical Specifications for Floating Production Systems (138). An embodiment of the data management system includes a Market Information Module (117) for enabling the user to query floating production system data by Supply Criteria (118), Demand Criteria (130), and Technical Specifications (138).

In viewing the screen regarding the Floating Production System (FPS) Supply Criteria (118), the user can use the query engine to search and collect information on availability of floating production systems by FPS Vessel Name (120). For example, a user-directed "Search by Vessel" of the FPSO Dalia displays the deployment status results of the FPSO Dalia as "en route to the field location in Block 17 off the coast of Angola, as of Mar. 10, 2006", and provides the user with information regarding the current contract length for the FPSO Dalia, which in turn informs the user of when the FPSO Dalia will become available.

The embodiments of the data management system enable the user to select additional parameters that the user can select for querying FPSO Supply Criteria, such as: an Operator of a floating production system (122), an Owner of a floating production system (124), a General Region for a floating production system (126), and a Type of floating production system (128). For example, a search by the user of the Operator Agip, would display supply information on the floating production system that includes the FPS vessels named the Agip Milano and Agip Sardegna. Other examples of Operators (122) include ExxonMobil of Angola and PetroChina of Indonesia, and examples of Owners (124) of floating production systems include ATP Oil & Gas and Bluewater.

The embodiments of the data management system enable the user to use Geographical Region (126) and Type (128) of floating production system in querying FPSO Supply Criteria. Examples of the Regions (126) for deployment and work regarding floating production systems include USA-Alaska, USA-Gulf of Mexico, and Central America. Examples of the Type (128) of floating production system can include FPSO, Semi, and Spar.

Further, the user can include data filtering by additional criteria, such as water depth for operation, a current project status criteria, a contract type and length, minimum or maximum capabilities, or available dates, which can be used by the user for refining the filtering and sorting of the floating production system data. For example, the Type (128) of floating production system required for an operation in a certain offshore field can vary by water depth capabilities, such as the deepwater floating production system working in the Usan field which operates at depths up to 2500 feet, or the semi-submersible floater system that will begin work in the Olowi field and operates at depths of 60 feet.

The embodiments of the data management system enable the user to select or add other search criteria and parameters for querying, tracking, and displaying floating production system data, which include: oil processing capacity in bbls/d, gas processing capacity MMScf/d, oil storage capacity bbls, and a start date and an end date of a search for floating production system data.

Figure 7B:
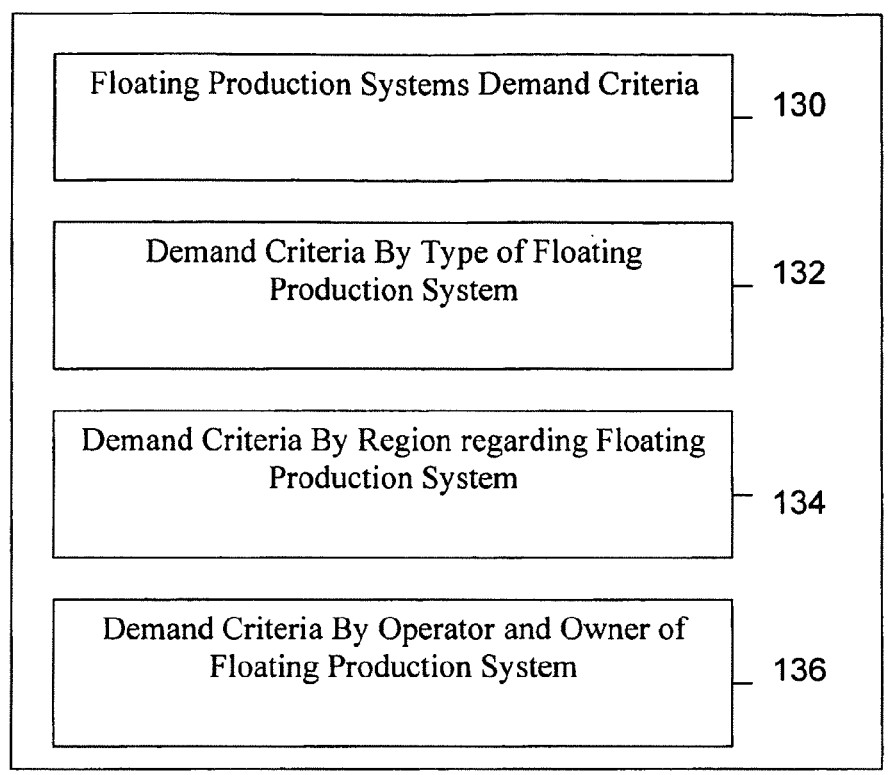
FIG. 7b depicts an embodiment of a sixth group of data usable in a system, method, and computer program for tracking and displaying floating production system data.

FIG. 7b depicts a sixth screen that a logged-in user would view to implement the system and method of the invention. In viewing the screen regarding the Floating Production System (FPS) Demand Criteria (130), the user can use the query engine to search and track information pertaining to floating production system demand requirements and inquiries by specifying a selection of search criteria including: FPS Types (132), Geographical Regions (134), and Operators (136) for floating production systems.

For example, a user can use the query engine to search and collect data information regarding Market Demand Criteria (130) for floating production systems based on FPS Types (132), such as floating production storage and offloading facilities (FPSO), floating storage and offloading systems (FSO), and semi-submersible floating production systems (Semi). Other parameters that can be selected by the user for searching and collecting data regarding Floating Production System Demand Criteria (130) include: Geographical Regions (134) for deployment and work of floating productions systems, such as USA-Pacific, Northwest Europe, Far East, and Australia/New Zealand, and Operators of floating production systems (136), such as AED Oil and ExxonMobil. The embodiments of the data management system allow the user to create new searches by entering new parameters, modify the existing searches with additional parameters, save a chosen search query, or repeat a saved query for use in configuring and generating a user report.

The embodiments of the data management system enable the user to select additional parameters in searching for Floating Production System (FPS) Demand Criteria (130). These additional parameters include, for example, searches by Fields, including Maari Field of New Zealand or Puffin Field of Australia, or by Project Status, such as the status of projects that are currently working floating production systems under contract, projects that are tendered, and projects that are possible or planned for work. Other additional parameters that can be used by a user for conducting searches for Demand Criteria using the data management system include water depth capacity for the floating production system, minimum and maximum capacities of the floating production systems, deployment status and dates of a floating production system for en route to a particular field or leaving from a particular field.

The embodiments of the data management system allow the user to display the received supply and demand data in both tabular and graphic form. In both visual display types, the system allows the user to select specific project data points, and the system then generates a pop-up display box or, at the user's discretion, opens a new browser window displaying a range of data related to the selected project, including Status, Region, Development Plan, Tender Start Date, Construction Start Date, Construction End Date, Production Start Date, Operator, and Water Depth.

Figure 7C:
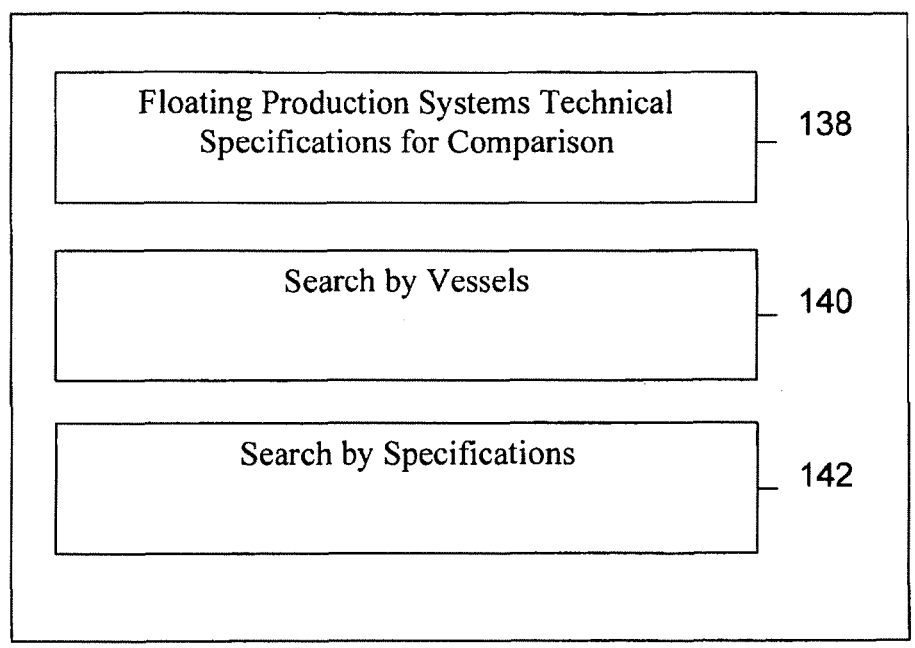
FIG. 7c depicts an embodiment of a seventh group of data usable in a system, method, and computer program for tracking and displaying floating production system data.

FIG. 7c depicts a seventh screen that a logged-in user would view to implement the system and method of the invention. In viewing this screen from the market menu regarding Floating Production Systems (FPS) Technical Specifications for Comparison (138), the user can use the query engine to search, track, compare, and analyze data information on floating production systems by: Vessel Names (140) and by Technical Specifications (142). The embodiments of the data management system provide visual representation capabilities for display to the user, such as tables, images, and other visual displays for analyzing and comparing the technical specifications of vessels and fleets of vessels for floating production systems. In selecting certain vessels, the user can compare the technical specifications of each vessel to the other vessels, and the user can add vessels for further comparisons in order to comply with certain market demand criteria.

The embodiments enable the user to use the query engine of the data management system to search and collect data information regarding Technical Specifications of Floating Production Systems (138) for further comparing and analyzing supply criteria to demand criteria. The user can use computer instructions of the system for identifying and comparing market supply, market demand, and utilization of the floating production systems by data based on selection of Vessel Names (140), such as Abu Cluster FPSO, Agip Milano, Acqua Blu, and other vessels or fleets of vessels.

The embodiments of the system and method enable the user to choose Technical Specifications (142), singularly or in multiples, for searching, comparing, and analyzing market supply, market demand, and utilization of the floating production systems. Examples of the technical specifications usable herein include: Class, Class Society, Conversion Cost, Drilling Depth Maximum, Flag, Gas Injection Capacity, Gas Production Capacity, Gas Lift Capacity, Gas Injector Well Quantity, other technical specifications for floating production systems, and combinations thereof.

The embodiments of the method and system enable the user to select a vessel name or names (140) and specific technical specifications (142) for performing the data search and display and, then, to initiate the search by selecting a "Run" button located on the Floating Production Systems (FPS) Technical Specifications for Comparison screen (138). After the search is performed, the user can extract the information for comparing and analyzing the technical specifications of one vessel to another vessel, the user can modify the comparison with additional specifications, the user can create a new comparison by selecting additional vessel names or new technical specifications, the user can use the comparison information for configuring a report for printing or downloading, and the user can access additional vessel-specific data on an individual vessel basis.

Figure 8:
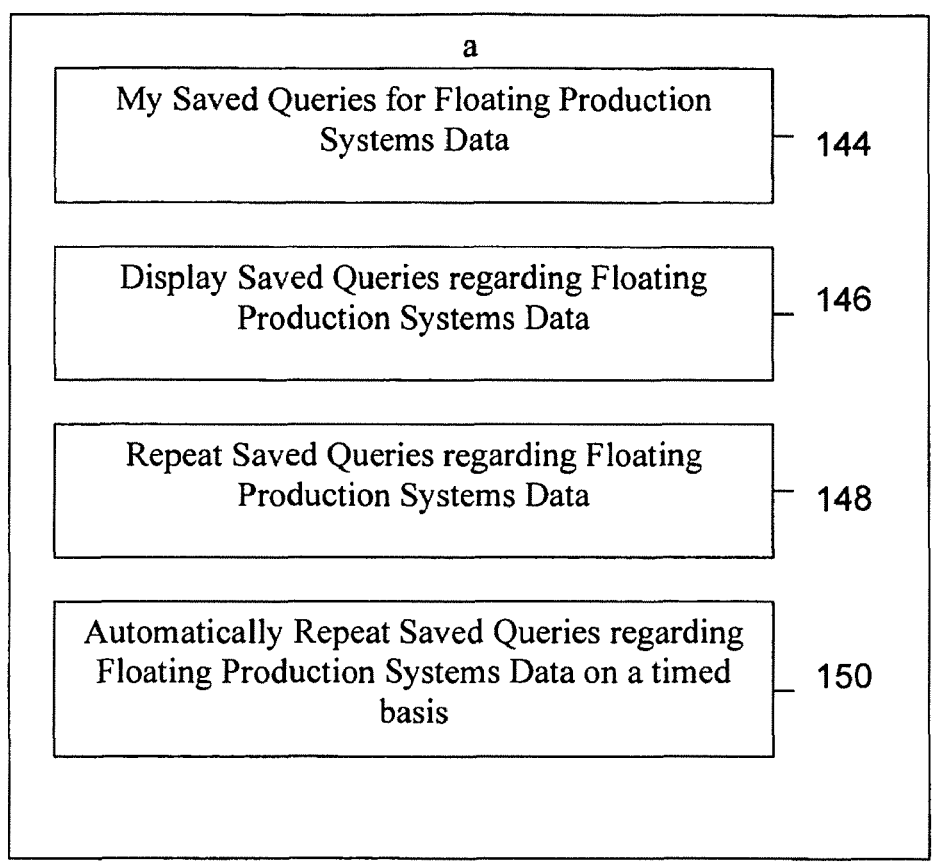
FIG. 8 depicts an embodiment of an eighth group of data usable in a system, method, and computer program for tracking and displaying floating production system data.

FIG. 8 depicts an eighth screen that a logged-in user would view to implement the system and method of the invention. In this step of the method, the user advances to "my FPSbase" menu pages for viewing the screen regarding My Saved Queries (144) for floating production system data.

The embodiments of the system and method include a processor with memory that includes one or more computer instructions to: display saved queries regarding floating production system data (146), repeat saved queries regarding floating production system data (148), and automatically repeat saved queries regarding floating production system data on a timed basis (150). In another embodiment of the system and method, modifications and deletions can be made to the floating production system data by running, modifying, or deleting user directed queries.

In viewing the screen regarding My Saved Queries (144), the user can save queries pertaining to floating production system data and market demands by specifying a selection of criteria including: Save Query and Record by Date (146), Save Query and Repeat Saved Query for production of a user report (148), and Save Query and Automatically Repeat Saved Query on a Timed Basis, such as weekly (150) for use in configuring a weekly comparison user report.

For example, a user can use the query engine to query and collect data information regarding Market Demand Criteria (130) for floating production systems based on FPS Types (132). Then, the user can save the query as "FPS Demand in US", and request the data management system to automatically repeat the named query on a weekly basis for configuring a user report on market demand criteria.

Figure 9:
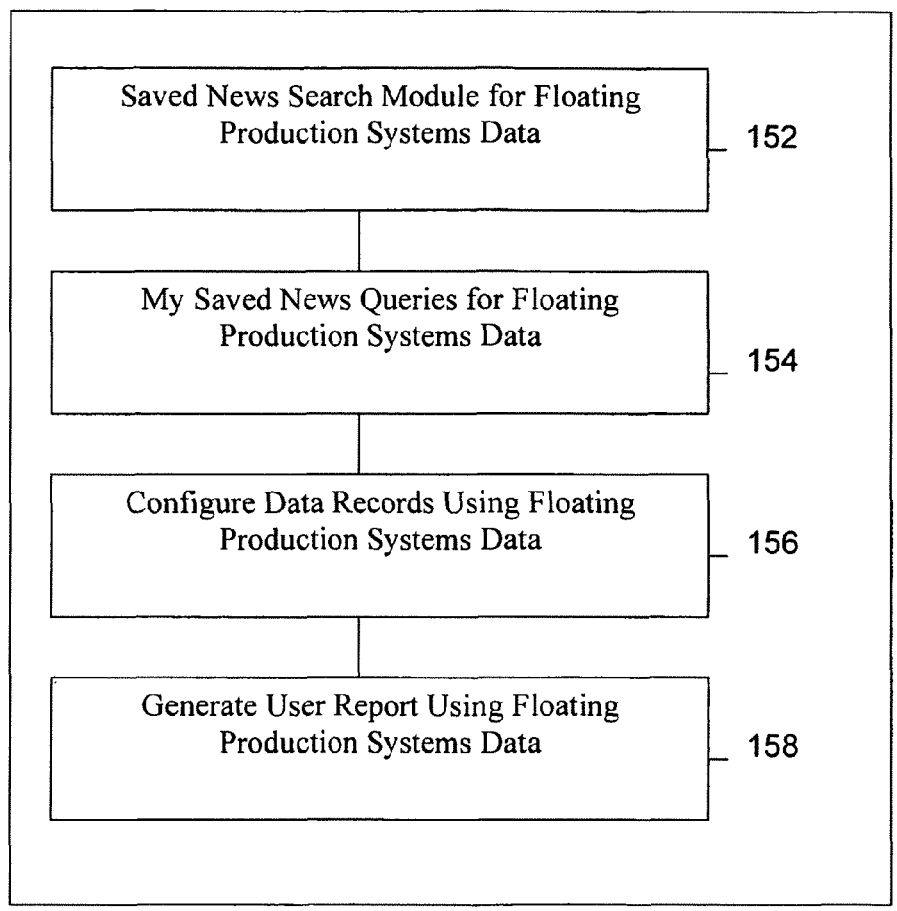
FIG. 9 depicts an embodiment of a ninth group of data usable in a system, method, and computer program for tracking and displaying floating production system data.

FIG. 9 depicts a ninth screen that a logged-in user would view to implement the system and method of the invention. In this step of the method, the user advances through "my FPS-base" menu pages for viewing the screen regarding My Saved News Searches (154) for floating production systems.

The embodiments of the data management system include a saved news search module (152) for saving news searches (154) by Region, Operator and Owner, Vessel Name, FPS Type, and other parameters. For example, a user can select the My Saved News Searches (154) screen to save queries that the user requested when viewing the News Finder Search (102) screen, in search of data information regarding market news stories of floating production systems. Because the parameters for querying and displaying the news stories included: a title, a first paragraph, a whole story, a query start date, a query end date, a region, a country, and combinations thereof, the embodiments of the system and method allow the user to save this data information by using the saved news search module.

Then, the user can use the created and saved data information for configuring a user report (156). The user report can include configurable data records, which can include data records with displayed fields, sort and groupings of data records, and formatted data records. For example, the configured user report can include data records on fields for work that can be referenced to a grouping of the data records on technical specifications. These data records can be further configured and formatted in the user report by using such visual images as: a table, a bar chart, a pie chart, a graph, other visual images, and combinations thereof for generating the user report (158).

In an embodiment, The Market Overview and Criteria (76) section, as discussed in FIG. 4, of the data management system can be used by the logged-in user to provide options for generating user report output by additional user criteria input, as in the case of an advanced search using Deployment Status, Project Status, Geographical Region, and FPS Type for floating production systems. The system also allows the user to group the report output by Regions, Status Criteria, or Type. Further the data management system includes computer instructions for including electronic records and recording electronic signatures for use in generating the user reports.

The data management system includes computer instructions for forecasting data for use in the user reports. The data management system can be adapted to forecast the fleet data for up to ten subsequent years.

The data management system provides access to one or more users for requesting to receive floating production system data, or a portion of previously requested data, pertaining to one of the floating production systems. Access to the data management system includes accessing a memory carrying one or more sequences of computer instructions, which when executed by one or more processors, cause the one or more processors to perform the steps of receiving from the memory of the data management system, a first request to receive at least a portion of a previously requested floating production system data. Then, the user can provide search criteria which can be used for extracting the floating production system data to determine if the search criteria provided by the user matches any of the floating production system data provided by the floating production systems. Then the data management system can be used for displaying the matched floating production system data and search criteria for generating a user report to be sent to the user.

The embodiments include a computer-readable medium having a plurality of computer instructions stored thereon, wherein the plurality of computer instructions, when executed by a processor, cause the processor to perform the steps of the method for providing floating production system data to a user through input from a graphical user interface to a processor of a data management system, wherein the plurality of computer instructions on the computer-readable medium includes: computer instructions for receiving floating production system data from one or more floating production systems, computer instructions for receiving one or more search criteria from the user to extract floating production system data that matches the one or more search criteria, computer instructions for displaying to the user the floating production system data that matches the one or more search criteria, computer instructions for generating a user report using the floating production system data matching the one or more search criteria, and computer instructions for sending the user report to the user using a communication link.

Further, the embodiments include a computer-readable medium with computer instructions for: updating the floating production system data continually or at least daily; forecasting fleet data; querying market overview data, status criteria, market news, technical specifications, and other floating production system data, and displaying the floating production system data and search criteria to one or more users of the data management system for generating user reports.

While these embodiments have been described with emphasis on the embodiments, it can be understood that within the scope of the appended claims, the embodiments might be practiced other than as specifically described herein.

What is claimed is:

1. A data management system for providing floating production system data to one or more users, wherein the data management system comprises: a memory carrying one or more sequences of computer instructions which, when executed by one or more processors, causes the one or more processors to perform the steps of:
   (a) receiving the floating production system data from a floating production system, wherein the floating production system data comprises a member selected from the group consisting of: daily operations data, technical data, market data, and combinations thereof;
   (b) receiving one or more search criteria from the one or more users;
   (c) comparing the floating production system data to the one or more search criteria to determine if the floating production system data matches the one or more search criteria, wherein the floating production system data comprises a member selected from the group consisting of: fleet data, upcoming tenders, latest project sanctions, vessels coming off contracts, market news, and combinations thereof;
   (d) generating a user report using the floating production system data matching the one or more search criteria; and
   (e) sending the user report to the one or more users using a communication link.

2. The data management system of claim 1, wherein the fleet data is updated at least daily using a member of the group consisting of: vessel names, fleet names with vessels, charts of fleets by region, charts of fleets by type of vessel, and combinations thereof.

3. The data management system of claim 2, wherein the data management system forecasts the fleet data for up to ten subsequent years.

4. The data management system of claim 1, wherein the latest project sanctions link to project details using communication links.

5. The data management system of claim 1, wherein the market news comprises analyses comments.

6. The data management system of claim 1, wherein the user report comprises electronic records and electronic signatures.

7. The data management system of claim 1, wherein the market data comprises a market overview with searchable content.

8. The data management system of claim 7, wherein the market overview comprises a query function with filters selected from a member of the group consisting of: a date, a range of dates, a status of the floating production system, a geographic region of the floating production system, a type of floating production system, and combinations thereof.

9. The data management system of claim 8, wherein the status of the floating production system is a deployment status, a project status, or combinations thereof.

10. The data management system of claim 1, wherein the user report comprises configurable data records selected from the group consisting of: data records with displayed fields, sort and groupings of data records, and formatted data records, wherein the formatting of the configurable data records is via a table, a bar chart, a pie chart, other visual display, or combinations thereof.

11. The data management system of claim 1, wherein the one or more users accesses a system comprising a memory carrying one or more sequences of computer instructions, which when executed by one or more processors, cause the one or more processors to perform the steps of receiving from the memory of the data management system, a first request to receive at least a portion of a previously requested floating production system data.

12. The data management system of claim 1, wherein the memory further comprises one or more additional computer instructions to display news stories by a member selected from the group consisting of: a title, a first paragraph, a whole story, a query start date, a query end date, and combinations thereof.

13. The data management system of claim 12, wherein the memory further comprises one or more computer instructions to filter news stories by region or country.

14. The data management system of claim 1, wherein the memory further comprises a market information module comprising: floating production system supply data, floating production system demand data, and technical specifications for floating production systems.

15. The data management system of claim 1, wherein the memory further comprises one or more computer instructions to display saved queries, repeat saved queries, and automatically repeat saved queries on a timed basis.

16. The data management system of claim 1, wherein the memory further comprises a saved news search module.

17. A method for providing floating production system data to a user, wherein the method comprises machine implemented steps of:
(a) receiving the floating production system data from one or more floating production systems;
(b) receiving one or more search criteria from the user to extract floating production system data that matches the one or more search criteria, wherein the one or more search criteria comprises a member selected from the group consisting of: fleet data, upcoming tenders, latest project sanctions, vessels coming off contracts, market news, and combinations thereof;
(c) displaying to the user the floating production system data that matches the one or more search criteria;
(d) generating a user report using the floating production system data matching the one or more search criteria; and
(e) sending the user report to the user using a communication link.

18. The method of claim 17, wherein the user report is updated continuously or at least daily with fleet data comprising a member selected from the group consisting of: vessel names, with vessels, charts of fleets by region, charts of fleets by type of vessel, and combinations thereof.

19. The method of claim 17, further comprising the step of generating a forecast of the fleet data for a period up to ten subsequent years.

20. The method of claim 17, further comprising collecting and storing floating production system data by linking the latest project sanctions to project details using communication links.

21. The method of claim 17, wherein the market news comprises analysis comments.

22. The method of claim 17, further comprising the step of generating electronic signatures with the user report.

23. The method of claim 17, further comprising the machine implemented steps of displaying market data comprising a market overview with searchable content to the user.

24. The method of claim 23, wherein the step of querying market overview data with searchable content is performed using filters selected from a member of the group consisting of: a date, a range of dates, a status of the floating production system, a geographic region of the floating production system, a type of floating production system, and combinations thereof.

25. The method of claim 24, further comprising the step of providing a status report of the floating production system data to the user, wherein the status report comprises: deployment status, project status, or combinations of deployment status and project status.

26. The method of claim 17, further comprising the step of generating the user report by using configurable data records selected from a member of the group consisting of: data records with displayed fields, sort and groupings of data records, and formatted data records, wherein the formatting of the configurable data records is via a table, a bar chart, a pie chart, other visual display, or combinations thereof.

27. The method of claim 17, further comprising the step of representing the market news in a reverse chronological order.

28. The method of claim 17, further comprising the step of using a finder query with display preference to display market news stories by a member selected from the group consisting of: a title, a first paragraph, a whole story, a query start date, a query end date, and combinations thereof.

29. The method of claim 28, further comprising the step of sorting and displaying of the market news stories by region or by country.

30. The method of claim 17, further comprising the step of representing of a market news story by using a market information module comprising: floating production system supply, floating production system demand, and technical specifications for floating production systems.

31. The method of claim 17, further comprising accessing the floating production system data on a timed basis by using a member selected from the group consisting of: saved queries, repeat saved queries, automatically repeat saved queries, and combinations thereof.

32. A computer-readable medium having thereon a plurality of computer instructions, wherein the plurality of computer instructions include computer instructions which, when executed by a processor, cause the processor to perform the steps of a method for providing floating production system data to a user through input from a graphical user interface to the processor of a data management system, wherein the plurality of computer instructions on the computer-readable medium comprises:

(a) computer instructions for receiving the floating production system data from one or more floating production system;

(b) computer instructions for receiving one or more search criteria from the user to extract floating production system data that matches the one or more search criteria, wherein the one or more search criteria comprises a member selected from the group consisting of: fleet data, upcoming tenders, latest project sanctions, vessels coming off contracts, market news, and combinations thereof;

(c) computer instructions for displaying to the user the floating production system data that matches the one or more search criteria;

(d) computer instructions for generating a user report using the floating production system data matching the one or more search criteria; and (e) computer instructions for sending the user report to the user using a communication link.

\* \* \* \* \*